(12) United States Patent  (10) Patent No.: US 6,494,481 B2
Yasuda  (45) Date of Patent: Dec. 17, 2002

(54) AIRBAG APPARATUS FOR FRONT PASSENGER SEAT

(75) Inventor: Mitsuo Yasuda, Fukumitsu-machi (JP)

(73) Assignee: Sanko Gosei Kabushiki Kaisha, Toyama-ken (JP)

( * ) Notice: Subject to any disclaimer, the term of this patent is extended or adjusted under 35 U.S.C. 154(b) by 0 days.

(21) Appl. No.: 09/836,664

(22) Filed: Apr. 17, 2001

(65) Prior Publication Data

US 2002/0149182 A1 Oct. 17, 2002

(51) Int. Cl.$^7$ .............................................. B60R 21/22
(52) U.S. Cl. ..................................... 280/732; 280/728.3
(58) Field of Search ........................... 280/728.3, 732, 280/731

(56) References Cited

U.S. PATENT DOCUMENTS

| | | | | |
|---|---|---|---|---|
| 4,148,503 A | * | 4/1979 | Shiratori et al. | 280/731 |
| 5,183,288 A | | 2/1993 | Inada et al. | 280/732 |
| 5,411,288 A | | 5/1995 | Steffens, Jr. | 280/728.3 |
| 5,569,959 A | | 10/1996 | Cooper et al. | 280/728.3 |
| 5,685,560 A | * | 11/1997 | Sugiyama et al. | 280/728.3 |
| 5,839,752 A | * | 11/1998 | Yamasaki et al. | 280/732 |
| 6,070,901 A | * | 6/2000 | Hazell et al. | 280/732 |
| 6,089,642 A | * | 7/2000 | Davis, Jr. et al. | 280/728.3 |

FOREIGN PATENT DOCUMENTS

| | | | | |
|---|---|---|---|---|
| JP | H5-325372 | | 12/1993 | ........... B60R/21/20 |
| JP | 6-144142 | * | 5/1994 | |
| JP | H10-7979 | | 1/1998 | ........... B60R/21/20 |
| JP | 2001-206180 | | 7/2001 | |

* cited by examiner

Primary Examiner—Eric Culbreth
(74) Attorney, Agent, or Firm—Ladas & Parry

(57) ABSTRACT

The airbag apparatus includes a fracture-opening section of an instrument panel cover located in opposition to an opening portion of an airbag case and capable of being split apart, and a plurality of reinforcements fixedly attached to the back surface of the fracture-opening section. The fracture-opening section includes a contour portion and a splitting portion, which, in turn, include fragile portions formed through laser processing. The reinforcements are attached to the fracture-opening section in such a manner as to correspond to subsections of the fracture-opening section into which the splitting portion divides the fracture-opening section. The reinforcements each include a hinge portion and a leg portion. An end of the leg portion is engaged with a plurality of hooks fixedly attached to side edges of the opening portion of the airbag case. Upon inflation of the airbag, the fracture-opening section opens apart along the splitting portion.

8 Claims, 4 Drawing Sheets

AIRBAG APPARATUS FOR FRONT PASSENGER SEAT

BACKGROUND OF THE INVENTION

1. Field of the Invention

The present invention relates to an airbag apparatus for a front passenger seat for protecting a passenger sitting in the front passenger seat upon collision of a vehicle, such as a car, to thereby ensure safety of the passenger. More particularly, the invention relates to an improvement in the structure of a fracture-opening section formed on the cover of an instrument panel in opposition to an airbag accommodated within an airbag apparatus for a front passenger seat which, in turn, is accommodated within the instrument panel. Upon collision of the vehicle, the airbag, inflates out of the instrument panel while breaking open the fracture-opening section, so as to protect the passenger.

2. Description of the Related Art

An airbag apparatus for a front passenger seat of a vehicle, such as a car, basically includes an airbag, an airbag case for accommodating the folded airbag, and an inflater for inflating the airbag. The airbag apparatus is accommodated within an instrument panel in opposition to the front passenger seat.

The instrument panel cover includes a cover plate having a size corresponding to that of an opening portion of the airbag case as disclosed in Japanese Patent Application Laid-Open (kokai) No. 7-172256 or includes a lid plate as proposed by the inventors of the present invention in Japanese Patent Application No. 10-7979. According to Japanese Patent Application No. 10-7979, the lid plate is located in opposition to the opening portion of the airbag case and is formed integrally with the instrument panel cover. The main body of a lid reinforcement is fixedly attached to the lid plate from inside along a peripheral edge portion of the lid plate. A portion of the reinforcement which extends from a hinge portion of the reinforcement extending upward from the main body of the reinforcement is fixedly attached to the airbag case via a bracket. Upon inflation of the airbag, the cover plate or the lid plate is opened.

The thus-configured airbag apparatus for a front passenger seat functions in the following manner. Upon collision of the vehicle, an impact force caused by the collision is detected by a sensor. A control unit including a CPU judges whether or not the detected impact force is equal to or higher than a predetermined value. When the control unit judges that the impact force is not lower than the predetermined value, the control unit issues a signal for causing the inflater to generate a predetermined gas. The gas is fed to the airbag so as to promptly inflate the airbag.

The inflating airbag presses, from inside, a fracture-opening lid, such as the cover plate or the lid plate, of the instrument panel cover. The lid is fractured along a fracture line and detached from the instrument panel cover. The detached lid is opened outward while being turned inside out about the hinge portion of the lid reinforcement.

The inflating airbag projects outward from the instrument panel cover through the thus-formed opening in the instrument panel cover. Serving as a cushion, the inflated airbag supports a front seat passenger at his/her chest and head, thereby protecting the passenger from the impact force of collision.

Generally, the conventional instrument panel of a vehicle has a fracture-opening lid formed thereon in such a manner as to face the front passenger seat of the vehicle; i.e., the lid is formed on an inclined plane of the instrument panel which faces a front seat passenger. Upon inflation of the airbag, the fracture-opening lid is detached from the inclined plane. The detached lid is opened outward while being turned inside out about the hinge portion of the lid reinforcement. The inflating airbag projects outward from the instrument panel. An edge of the thus-detached lid may injure the front seat passenger. When the passenger is a child, detachment of the lid occurs in the vicinity of the face of the child, thus doubling the degree of danger.

In order to prevent the above danger, an airbag apparatus for a front passenger seat as shown in FIG. 1 has been developed.

An airbag apparatus for a front passenger seat 1 shown in FIG. 1 is disposed within an instrument panel such that an airbag 4 inflated by means of gas from an inflater projects from a substantially horizontal plane 3a of an instrument panel cover 3 located in the vicinity of a windshield la of a vehicle. The airbag apparatus includes an airbag case 5 adapted to accommodate the folded airbag 4 and having an opening portion 5a formed in opposition to the back surface of the instrument panel cover 3. A flexible fracture-opening lid 6 formed of a synthetic resin is disposed at an opening portion 3b formed on the instrument panel cover 3 in opposition to the opening portion 5a of the airbag case 5. Upon inflation of the airbag 4, the fracture-opening lid 6 is split open into two fracture pieces, which open apart in opposite directions toward the front and rear of the vehicle, respectively, through fracture along grooves 6a and 6b, which are formed along the centerline of and the periphery of the fracture-opening lid 6 and serve as fragile portions. The inflating airbag 4 projects outward through the thus-formed opening.

A mounting leg portion 7 and a plurality of engagement pieces 8 are integrally formed on the back surface of the fracture-opening lid 6. The mounting leg portion 7 assumes the form of a rectangular frame slightly greater in size than the opening portion 5a of the airbag case 5. The engagement pieces 8 are elastically engaged with the edge of the opening portion 3b of the instrument panel cover 3. A plurality of rectangular through-holes 7c are formed in a front wall 7a of and in a rear wall 7b of the mounting leg portion 7. When the fracture-opening lid 6 is fitted to the opening portion 3b of the instrument panel cover 3, the rectangular through-holes 7c are engaged with corresponding hooks 9 fixedly attached to a front wall 5b of and to a rear wall 5b of the opening portion 5a of the airbag case 5.

Upon inflation of the airbag 4, the fracture-opening lid 6 is split open into two fracture pieces, which open apart in opposite directions toward the front and rear of the vehicle, respectively, through fracture along the grooves 6a and 6b, which are formed along the centerline of and the periphery of the fracture-opening lid 6. Since the rectangular through-holes 7c formed in the front and rear walls 7a and 7c of the mounting leg portion 7 are engaged with the hooks 9 fixedly attached to the front and rear walls 5b of the opening portion 5a of the airbag case 5, scattering of the fracture pieces of the fracture-opening lid 6 is prevented.

According to the airbag apparatus for a front passenger seat shown in FIG. 1, the opening portion 3b is formed in the instrument panel cover 3 in such a manner as to face the opening portion 5a of the airbag case 5. The fracture-opening lid 6 is a discrete element different from the instrument panel cover 3 and made of a flexible resin material and is fitted into the opening portion 3b. Thus, the manufacture and the assembly work of the instrument panel cover 3 and the fracture-opening lid 6 are rather complicated. Also, the fracture-opening lid 6 easily deforms when an external force is applied thereto, thereby damaging the appearance or design of the instrument panel cover 3.

Also, the discrete fracture-opening lid 6 is not reinforced from behind. Since the fracture-opening lid 6 is made of a flexible material, upon inflation of the airbag 4, the leg portion 7 is likely to disengage from the hooks 9 fixedly attached to the front and rear walls 5b of the opening portion 5a of the airbag case 5, potentially involving scattering of fracture pieces of the fracture-opening lid 6.

SUMMARY OF THE INVENTION

An object of the present invention is to solve the above-mentioned problems in the conventional airbag apparatus for a front passenger seat and to provide an airbag apparatus for a front passenger seat which can be manufactured and assembled easily, whose fracture-opening section can be fractured reliably upon inflation of an airbag while maintaining high safety, and which has an improved appearance.

In order to achieve the above object, the present invention provides an airbag apparatus for a front passenger seat built in an instrument panel of a vehicle, comprising: an airbag case accommodated within a core of the instrument panel and having an opening portion located in opposition to a back surface of a cover of the instrument panel; an airbag accommodated within the airbag case in a folded state, the airbag being able to be inflated by means of gas from an inflater; a fracture-opening section defined in the cover to be located in opposition to the opening portion of the airbag case, the fracture-opening section having a fragile contour portion surrounding the fracture-opening section and a fragile splitting portion for dividing t he fracture-opening section into first and second subsections; and first and second reinforcements fixedly attached to back surfaces of the first and second subsections, each of the first and second reinforcements having a hinge portion and a leg portion whose end is engaged with a hook fixedly attached to the opening portion of the airbag case, whereby the fracture-opening section opens apart along the fragile splitting portion upon inflation of the airbag.

The above configuration facilitates manufacture, allows the fracture-opening section to be reliably fractured along the contour portion and the splitting portion while maintaining high safety, and imparts favorable appearance or de sign to the instrument panel.

DESCRIPTION OF THE PREFERRED EMBODIMENT

An embodiment of the present invention will next be described in detail with reference to the drawings.

In the present specification, the terms "front" and "rear" correspond to the front and rear, respectively, of a vehicle, and the terms "right" and "left" correspond to the right-hand and left-hand sides, respectively, of the vehicle.

Figure 1:
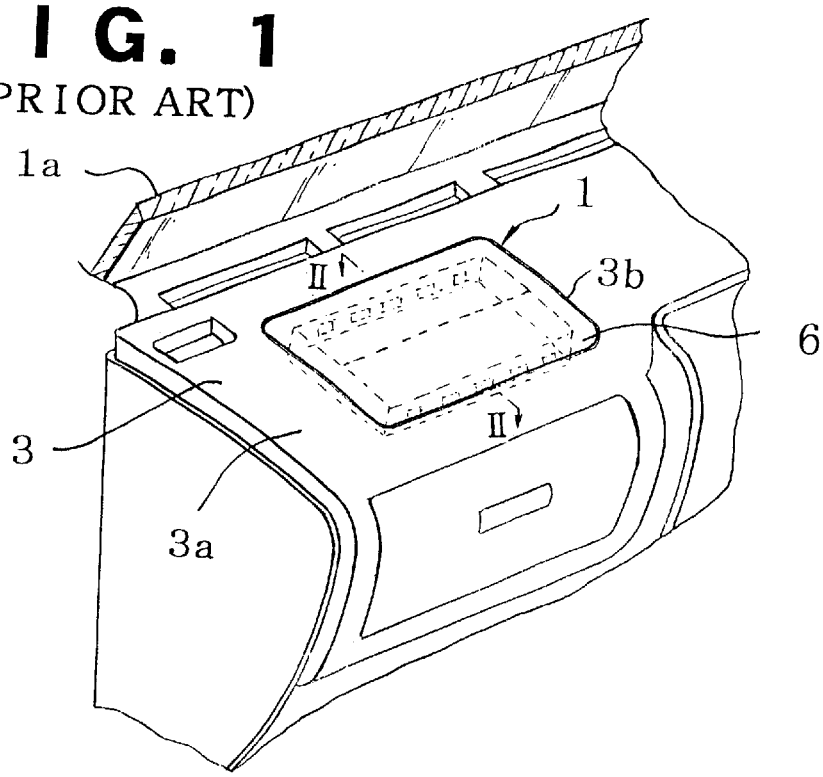
FIG. 1 is a perspective view showing a conventional instrument panel cover having a fracture-opening section for allowing an inflating airbag to project outward therethrough.
Figure 2:
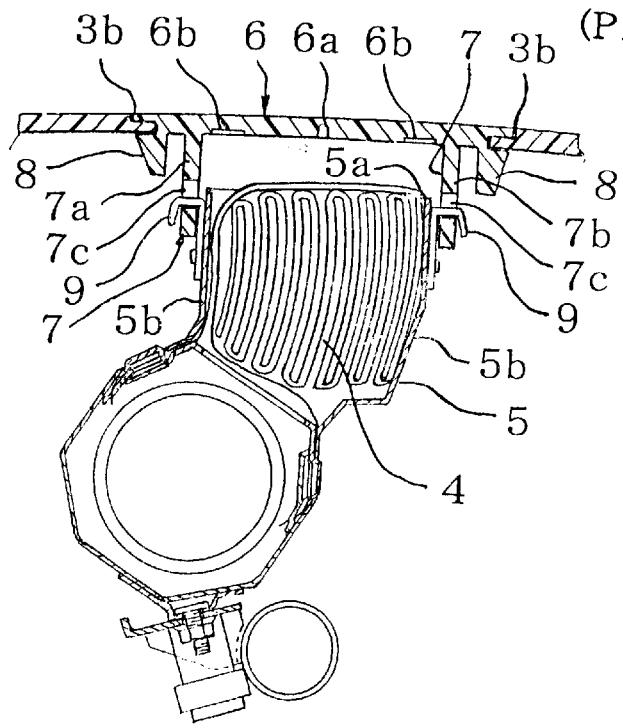
FIG. 2 is a vertical sectional view of a conventional airbag apparatus for a front passenger seat taken along line II—II of FIG. 1.
Figure 3:
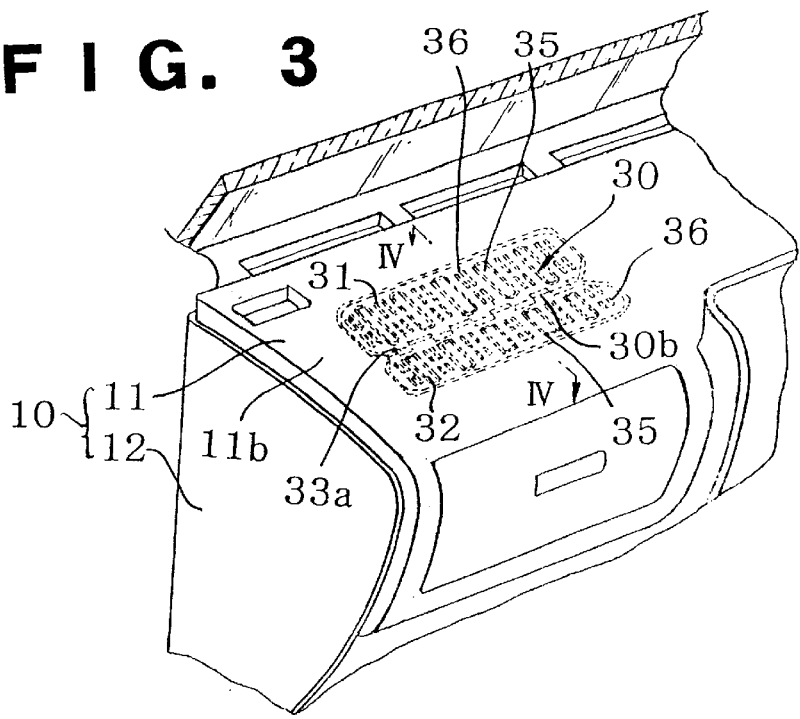
FIG. 3 is a perspective view of a main portion of an instrument panel cover equipped with an airbag apparatus for a front passenger seat according to an embodiment of the present invention.
Figure 4:
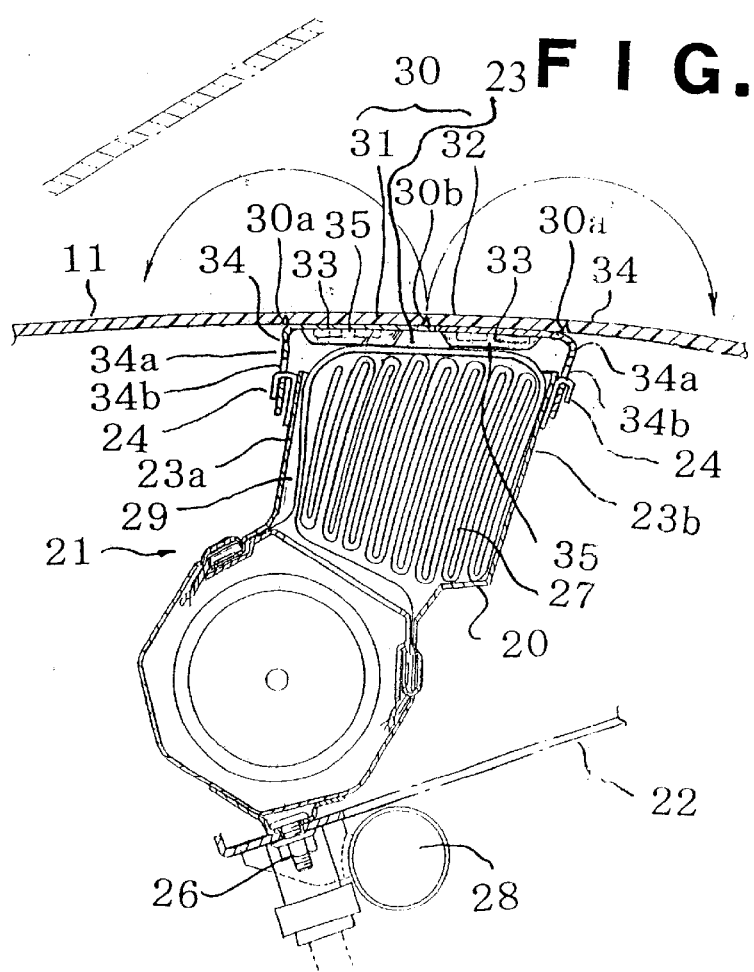
FIG. 4 is a vertical sectional view of the airbag apparatus of the embodiment taken along line IV—IV of FIG. 3.
Figure 5:
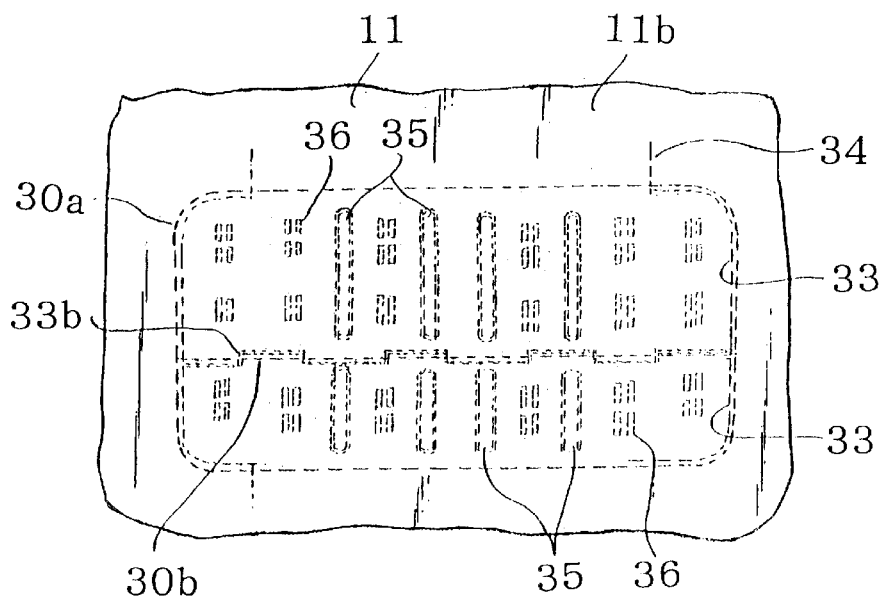
FIG. 5 is a partial plan view of an instrument panel cover including a fracture-opening section which partially constitutes the airbag apparatus of the embodiment.

As shown in FIGS. 3 and 4, an instrument panel 10 includes an instrument panel core 12 and an instrument panel cover 11, which covers the instrument panel core 12. The instrument panel core 12 and the instrument panel cover 11 are each molded from a synthetic resin, such as polypropylene. The instrument panel cover 11 is fixedly attached, by appropriate means, such as tapping screws, to the instrument panel core 12, which, in turn, is fixedly attached to a frame (not shown) of a vehicle.

As shown in FIG. 4, an accommodation section 21 for accommodating a metallic airbag case 20 is defined by means of a partition 22 behind the instrument panel cover 11 and located in opposition to a front seat passenger seat. The present embodiment is applied to a right-hand drive. A left-hand drive employs a mirror image of the configuration of the present embodiment.

The partition 22 is removably attached to the instrument panel cover 11 using a plurality of tapping screws in order to facilitate the attachment of the airbag case 20 and other elements to the instrument panel cover 11.

A fracture-opening section 30, which is split open upon inflation of an airbag, is formed on the instrument panel cover 11 in opposition to the accommodation section 21. The fracture-opening section 30 assumes a substantially rectangular shape and an area substantially equal to that of an opening portion 23 of the airbag case 20. The fracture-opening section 30 can be split into two pieces along a splitting portion 30b, which includes fragile portions formed through laser processing, which will be described later.

The airbag case 20 is accommodated within the accommodation section 21 in the following manner. As shown in FIG. 4, a plurality of hooks 24 are fixedly attached in a row to front and rear walls 23a and 23b of the opening portion 23 of the airbag case 20. Each of the hooks 24 is bent outward at an upper end portion. A pair of reinforcements 33 are fixedly attached, at respective end portions, to the back surface of the fracture-opening section 30 through thermal bonding or like processing. The reinforcements 30 each include a hinge portion 34 and a leg portion 34a extending downward from the hinge portion 34; i.e., extending away from the fixedly attached end portion. A plurality of slots 34b are formed in the leg portion 34a of each reinforcement 33 in such a manner as to extend therethrough in the front-rear direction. The hooks 24 are engaged with the corresponding slots 34b through utilization of the elasticity of the leg portions 34a. A lower end portion of the airbag case 20 is fixedly attached to the partition 22 by means of bolts and nuts 26.

An airbag 27 is accommodated in a folded condition within the airbag case 20. The airbag 27 is connected to an inflater (not shown) disposed outside the partition 22, by means of a gas feed pipe 28.

An airbag protection cover 29 made of thin cloth of synthetic fiber closes the opening portion 23 of the airbag case 20. The airbag protection cover 29 is adapted to prevent the folded airbag 27 from coming out from the airbag case 20 and breaks easily upon inflation of the airbag 27.

Assuming a size corresponding to that of the opening portion 23 of the airbag case 20 of the instrument panel cover 11, the fracture-opening section 30 includes a splitting portion 30b, which extends in the right-and-left direction at a substantially central portion while dividing the fracture-opening section 30 into a front subsection 31 and a rear subsection 32.

The splitting portion 30b is biased toward the front passenger seat such that, between the two subsections 31 and 32 of the fracture-opening section 30, the subsection 32 located on the side of the front passenger seat of the vehicle is slightly smaller in area than the other subsection 31 located on the side of the windshield of the vehicle.

A contour portion 30a of and the splitting portion 30b of the fracture-opening section 30 include fragile portions formed by means of a laser (not shown). Specifically, a pulsating laser beam is applied from behind the instrument panel cover 11 while being moved relatively along the contour portion 30a and the splitting portion 30b to thereby form the fragile portions. The two reinforcements 33 are fixedly attached to the back surfaces of the subsections 31 and 32 of the fracture-opening section 30 through thermal bonding or like processing. Upon inflation of the airbag 27, the fracture-opening portion 30 is split open such that the subsections 31 and 32 are turned inside out about the hinge portions of the reinforcements 33 in opposite directions.

Figure 6:
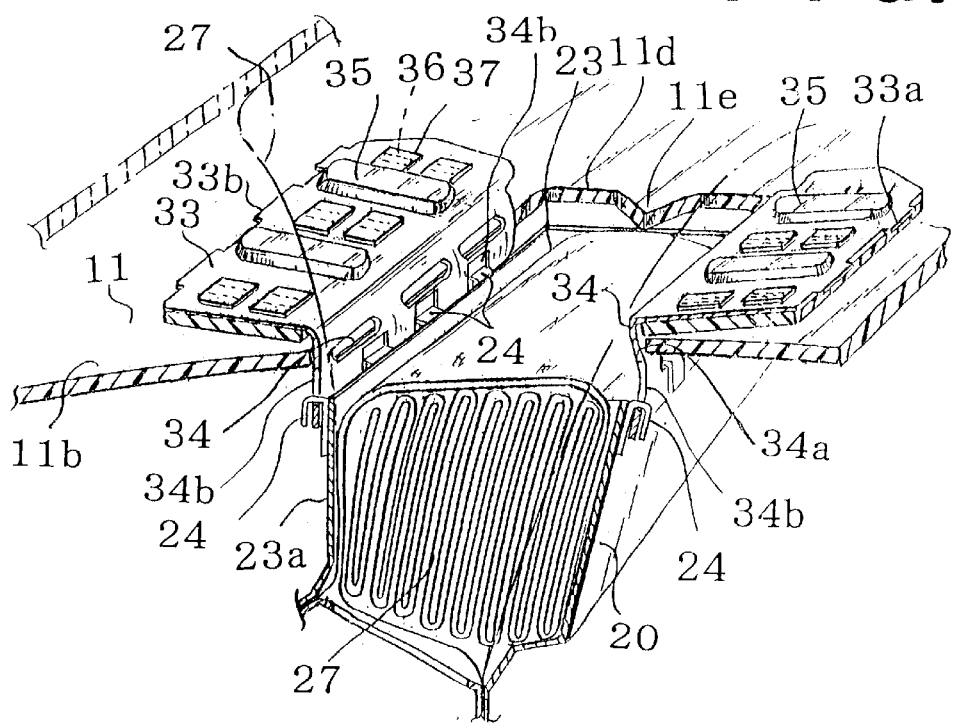
FIG. 6 is a perspective view of a main portion of the airbag apparatus of the embodiment, showing reinforcements as observed upon initiation of the airbag apparatus.

As shown in FIG. 6, one reinforcement 33 assumes a substantially rectangular shape corresponding to that of the subsection 31 of the fracture-opening section 30, while the other reinforcement 33 assumes a substantially rectangular shape corresponding to that of the subsection 32 of the fracture-opening section 30. The reinforcements 33 each include the hinge portion 34 extending in the longitudinal direction and the leg portion 34a extending downward from the hinge portion 34. The leg portion 34a has the slots 34b formed therein in such a manner as to extend therethrough in the front-rear direction and to be arranged in a row in the longitudinal direction. The slots 34b are engaged with the plurality of hooks 24 fixedly attached at constant intervals to the front and rear walls 23a and 23b of the airbag case 20. The slots 34b and the hooks 24 are engaged such that a gap of 4 mm to 7 mm is formed between the hook 24 and the bottom of the slot 34b.

A plurality of depressions 35 are formed, for reinforcement purpose, on each of the reinforcements 33 in such a manner as to extend in the short-side direction of the reinforcement 33 and to be arranged at certain intervals in the long-side direction of the reinforcement 33. Blocks of coupling holes 36 are formed on each of the reinforcements 33 while being arranged in the short-side and long-side directions of the reinforcement 33. Each block includes a plurality of coupling holes 36 extending in the short-side direction of the reinforcement 33 and arranged close to one another in the short-side and long-side directions of the reinforcement 33.

Protrusions 33a and 33b are respectively formed at the facing end portions of the reinforcements 33 such that the protrusions 33a and 33b are alternately arranged along the splitting portion 30b of the fracture-opening section 30.

The upper end of the opening portion 23 of the airbag case 20 is located in the vicinity of the back surface of the fracture-opening section 30 such that the airbag 27 accommodated within the airbag case 20 abuts the fragile portions of the contour portion 30a and the fragile portions of the splitting portion 30b via the reinforcements 33 to thereby reinforce the fragile portions against an external force to be potentially applied to the instrument panel cover 11, on which the fragile portions are formed.

A plurality of elongated protrusions 37 are formed on the inner surfaces of the subsections 31 and 32 of the fracture-opening section 30 in such a manner as to be aligned with the coupling holes 36 formed on the reinforcements 33. The elongated protrusions 37 are engaged with the corresponding coupling holes 36, and the tip ends of the protrusions 37 are melted through application of heat, such that the tip ends are flattened. Thus, the reinforcements 33 are fixedly attached to the corresponding front and rear subsections 31 and 32.

Next will be described a method for forming the fracture-opening section 30 on the instrument panel cover 11 located in opposition to the accommodation section 21.

The contour portion 30a and the splitting portion 30b of the fracture-opening section 30, which is split open upon inflation of the airbag 27, are formed on the instrument panel cover 11 by means of a laser. Specifically, a pulsating laser beam (output: 3 kW to 5 kW) of a predetermined frequency (e.g., 7 kHz) from a laser is applied to the instrument panel cover 11 from behind while being moved relatively at a predetermined speed along the outline edge of the reinforcement 33 fixedly attached to the back surface of the instrument panel cover 11. Thus, groove-like fragile portions are formed on the instrument panel cover 11 according to the relative speed of movement of and the pulsation pattern of a laser beam emitted from the laser.

As mentioned above, grooves serving as fragile portions are formed on the instrument panel cover 11 at a certain pattern along the entire outline edge of the reinforcement 33. The thus-formed fragile portions define the contour portion 30a and the splitting portion 30b, along which the fracture-opening section 30 fractures upon inflation of the airbag 27.

Preferably, the subsection 32 of the fracture-opening section 30, which is located on the side of the front passenger seat of a vehicle, assumes such a size as not to project beyond the instrument panel cover 11 toward the passenger seat upon inflation of the airbag 27.

The thus-configured airbag apparatus for a front passenger seat according to the present embodiment of the present invention functions in the following manner. Upon collision of the vehicle, an impact force caused by the collision is detected by a sensor. A control unit including a CPU judges whether or not the detected impact force is equal to or higher than a predetermined value. When the control unit judges that the impact force is not lower than the predetermined value, the control unit issues a signal for causing the inflater to generate a predetermined gas. The gas is fed to the airbag 27 so as to promptly inflate the airbag 27.

The inflating airbag 27 presses, from inside, the fracture-opening section 30 of the instrument panel cover 11. As a result, as shown in FIG. 6, the front and rear subsections 31 and 32 of the fracture-opening section 30 are fractured along the contour portion 30a and the splitting portion 30b and detached from the instrument panel cover 11. The detached front and rear subsections 31 and 32 are opened outward while being turned inside out about the hinge portions 34 of the reinforcements 33. Since the slots 34b formed in the leg portions 34a of the reinforcements 33 are engaged with the hooks 24 of the airbag case 20, scattering of the subsections 31 and 32 is prevented.

The inflating airbag 27 projects outward from the instrument panel cover 11 through the thus-formed opening in the instrument panel cover 11. Serving as a cushion, the inflated airbag 27 supports a front seat passenger at his/her chest and head, thereby protecting the passenger from the impact force of collision.

According to the thus-configured airbag apparatus for a front passenger seat, the fracture-opening section 30 is formed on the back surface of the instrument panel cover 11 such that the fracture-opening section 30 can be fractured along the contour portion 30a and the splitting portion 30b composed of fragile portions, which are formed through laser processing. Thus, the fracture-opening portion 30 is invisible on the surface of a substantially horizontal plane 11b of the instrument panel cover 11, thereby enhancing the design of the instrument panel cover 11 and enabling reliable, prompt fracture of the fracture-opening section 30 upon inflation of the airbag 27.

Figure 7:
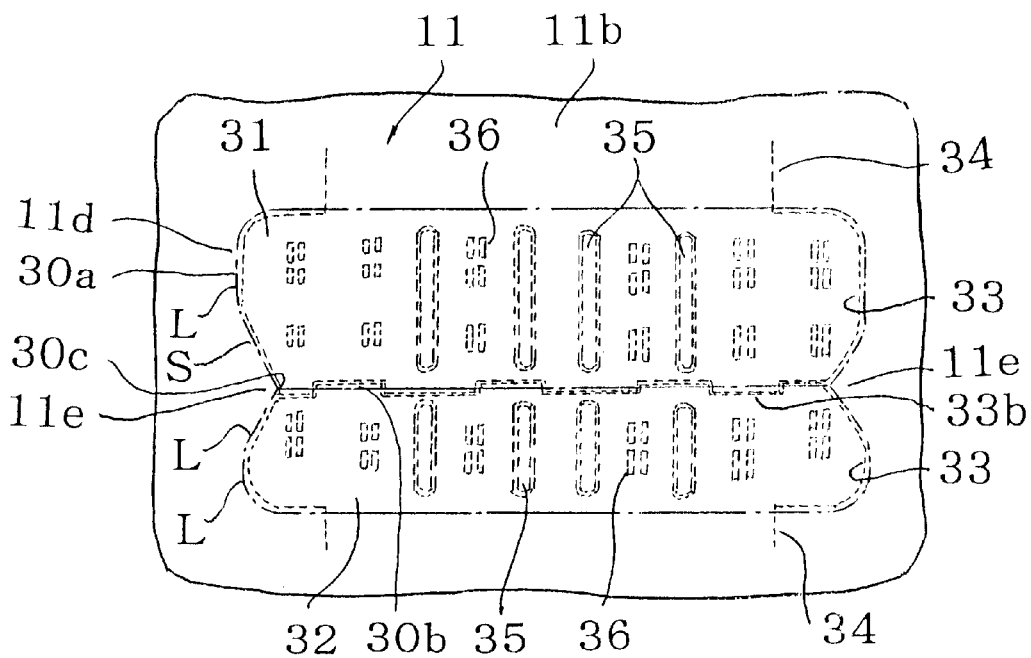
FIG. 7 is a partial plan view of an instrument panel cover showing a modified example of the fracture-opening section which partially constitutes the airbag apparatus according to the embodiment.
Figure 8:
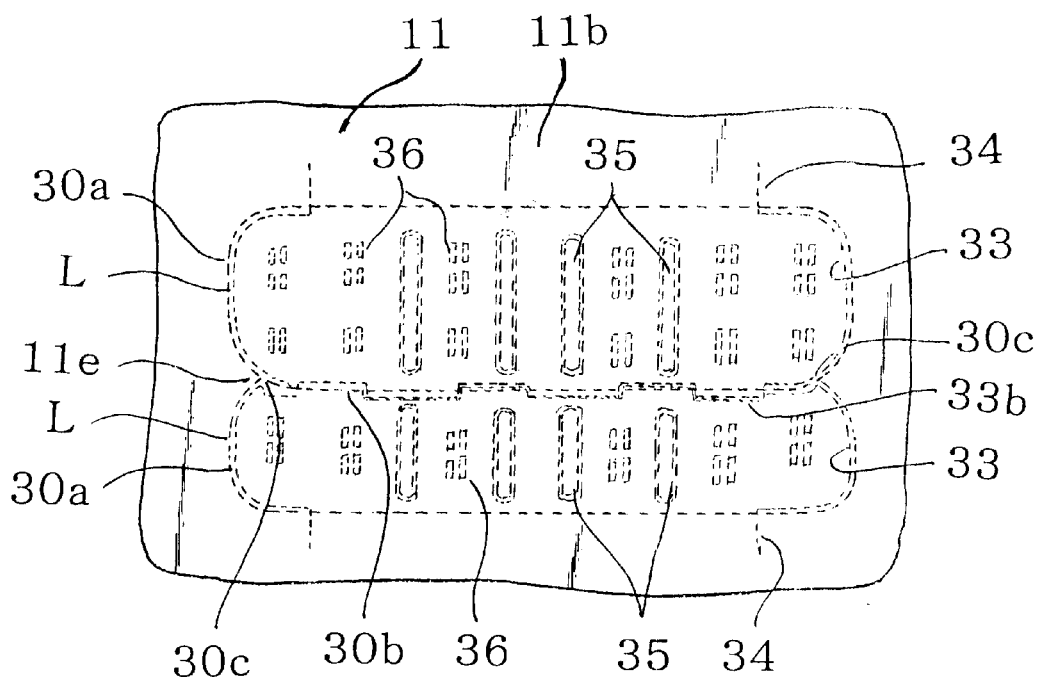
FIG. 8 is a partial plan view of an instrument panel cover showing another modified example of the fracture-opening section which partially constitutes the airbag apparatus according to the embodiment.

The above embodiment is described while mentioning the right-hand and left-hand contour portions 30a of the fracture-opening portion 30 which are formed straight on the back surface of the instrument panel cover 11. However, the present invention is not limited thereto. For example, as shown in FIGS. 7 and 8, the right-hand and left-hand contour portions 30a, including fragile portions, of the front and rear subsections 31 and 32 of the fracture-opening section 30 each assume the form of a combination of convex curves L terminating at an end 30c of the splitting portion 30b or the form of a combination of a convex curve L and a straight line S terminating at the end 30c of the splitting portion 30b, such that the opening portion 11d of the panel cover 11 has a projecting portion 11e in opposition to the end 30c of the splitting portion 30b, and the splitting portion 30b is located in a manner biased toward the front passenger seat of the vehicle. Through impartment of the above form to the right-hand and left-hand contour portions 30a, sharp edges to be potentially formed on the peripheral corners of the front and rear subsections 31 and 32 of the fracture-opening section 30 can be reduced.

According to the above embodiment, the fragile portions formed at the contour portion 30a of and at the splitting portion 30b of the fracture-opening section 30 are formed such that a laser beam is applied to the instrument panel cover 11 from behind while being moved relatively along the contour portion 30a and the splitting portion 30b. However, the present invention is not limited thereto. For example, grooves which serve as the fragile portions may be formed on the back surface of the instrument panel cover 11 by means of a mold.

In the airbag apparatus of the present invention, the subsections of the fracture-opening section into which the fracture-opening section is split upon inflation of the airbag are reliably connected to the airbag case by means of the corresponding reinforcements. Therefore, the subsections do not scatter off.

Moreover, since the fracture-opening section is formed on a substantially horizontal portion of the instrument panel cover located in the vicinity of the windshield, upon inflation of the airbag, subsections of the fracture-opening section do not reach a front seat passenger, to thereby prevent potential injury to the passenger by an edge of a subsection. When the passenger is a child, the fracture-opening section fractures sufficiently away from the face of the child, thereby avoiding endangering the child.

What is claimed is:

1. An airbag apparatus for a front passenger seat built in an instrument panel of a vehicle, comprising:
    an airbag case accommodated within a core of said instrument panel and having an opening portion located in opposition to a back surface of a cover of said instrument panel;
    an airbag accommodated within said airbag case in a folded state, said airbag being able to be inflated by means of gas from an inflator;
    a fracture-opening section defined in said cover to be located in opposition to the opening portion of said airbag case, said fracture-opening section having a fragile contour portion surrounding said fracture-opening section and a fragile splitting portion for dividing said fracture-opening section into first and second subsections, wherein the first subsection is bigger than the second subsection; and
    first and second reinforcements fixedly attached to back surfaces of said first and second subsections, each of said first and second reinforcements having a hinge portion and a leg portion whose end is engaged with a hook fixedly attached to the opening portion of said airbag case,
    whereby said fracture-opening section opens apart along the fragile splitting portion upon inflation of the airbag;
    wherein said fracture-opening section is defined in a substantially horizontal portion of the cover of said instrument panel which is located in the vicinity of the windshield of the vehicle.

2. An airbag apparatus for a front passenger seat according to claim 1, wherein the opening portion of said airbag case is disposed in the vicinity of said fracture-opening section such that said airbag accommodated within said airbag case reinforces, by means of the first and second reinforcements, the fragile contour and splitting portions of the fracture-opening section against an external force.

3. An airbag apparatus for a front passenger seat according to claim 1, wherein protrusions are formed at facing end portions of said first and second reinforcements such that the protrusions of said first reinforcement and the protrusions of said second reinforcement are alternately arranged along the fragile splitting portion.

4. An airbag apparatus for a front passenger seat according to claim 1, wherein lateral portions of the fragile contour portion each assume the form of a combination of convex curves or the form of a combination of convex curves and straight lines, such that the cover has a projecting portion in opposition to each of the opposite ends of the fragile splitting portion, and wherein the fragile splitting portion is spaced from the center of said fracture-opening section so that the first and the second fracture-opening subsections are asymmetrical with respect to each other.

5. An airbag apparatus for a front passenger seat according to claim 1, wherein the subsection of said fracture-opening section located on the side of the passenger seat of the vehicle assumes such a size that, upon inflation of said airbag, the subsection does not project beyond said instrument panel toward the passenger seat.

6. An airbag apparatus for a front passenger seat according to claim 1, wherein the fragile contour portion and the fragile splitting portion of said fracture-opening section are formed by applying a pulsating laser beam to the cover of said instrument panel from behind while moving the laser beam at a predetermined speed along the fragile contour portion and the fragile splitting portion.

7. The airbag apparatus according to claim 1, wherein the fragile splitting portion is substantially parallel to a windshield of the vehicle, the first subsection is on the side of the windshield, and the second subsection is on the side of a passenger seat of the vehicle.

8. The airbag apparatus according to claim 1, wherein the second subsection is approximately one half of the size of the first subsection so that, upon inflation of the airbag, the second subsection will not project beyond the instrument panel toward a passenger.

* * * * *